United States Patent

Yokokawa et al.

[11] Patent Number: 5,837,334
[45] Date of Patent: Nov. 17, 1998

[54] LARGE SIZED QUARTZ GLASS TUBE, LARGE SCALE QUARTZ GLASS PREFORM, PROCESS FOR MANUFACTURING THE SAME AND QUARTZ GLASS OPTICAL FIBER

[75] Inventors: Kiyoshi Yokokawa, Annaka; Masaaki Aoyama, Koriyama, both of Japan; Gerhart Vilsmeier, Aschaffenburg, Germany

[73] Assignees: Heraeus Quarzglas GmbH, Germany; Shin-ETSU Quartz Products Col, Ltd., Japan

[21] Appl. No.: 710,401

[22] Filed: Sep. 17, 1996

Related U.S. Application Data

[63] Continuation of Ser. No. 154,692, Nov. 18, 1993, abandoned.

[30] Foreign Application Priority Data

| Nov. 19, 1992 | [JP] | Japan | 4-332203 |
| Aug. 19, 1993 | [JP] | Japan | 5-226669 |
| Aug. 20, 1993 | [JP] | Japan | 5-226670 |
| Aug. 20, 1993 | [JP] | Japan | 5-226671 |

[51] Int. Cl.$^6$ ............................................. C03B 37/012
[52] U.S. Cl. .................. 428/34.4; 428/212; 428/332; 428/426; 428/542.8; 65/385; 65/412; 65/429; 65/433
[58] Field of Search ................... 428/34.4, 426, 428/332, 212, 701, 702, 34.6, 542.8; 65/3.1, 3.11, 3.12, 412, 385, 429, 433; 385/127

[56] References Cited

U.S. PATENT DOCUMENTS

| 2,272,342 | 2/1942 | Hyde | 49/78.1 |
| 3,455,666 | 7/1969 | Bazinet, Jr. | 65/403 |
| 3,711,262 | 1/1973 | Keck et al. | 65/3 |
| 3,932,162 | 1/1976 | Blankenship | 65/3 |
| 4,217,027 | 8/1980 | MacChesney et al. | 350/96.3 |
| 4,854,956 | 8/1989 | Pluijms | 65/391 |
| 4,882,209 | 11/1989 | Maruyama | 428/34.4 |
| 5,106,402 | 4/1992 | Geittner et al. | 65/3.12 |

FOREIGN PATENT DOCUMENTS

| 52-92530 | 4/1977 | Japan. |
| 52-134623 | 11/1977 | Japan. |
| 2 109 367 | 6/1983 | United Kingdom. |

OTHER PUBLICATIONS

Application Technology of High–Purity Silica, CMC Co., Ltd., Mar. 1, 1991 pp. 103–106.

High Precision Machining, Kogyo Chosakai Publishing Co., Ltd., Aug. 30, 1984, p. 421.

Vapor–Phase Verneuil Method, General National Conference of Electronic Communication Society, 1977, pp. 4–96.

Primary Examiner—Rena Dye
Attorney, Agent, or Firm—Finnegan, Henderson Farabow, Garrett & Dunner, L.L.P.

[57] ABSTRACT

A quartz glass tube, produced by mechanically processing a natural/synthetic quartz glass mother material, having 50–300 mm$\phi$ in outer diameter, from. 1 to 7 in outer to inner diameter ratio, 10 mm or more in thickness and 2% or less in thickness error; a large-scale quartz glass preform integrally combining the large-sized quartz glass tube with a core glass rod for an optical fiber using a rod-in-tube technique; and a method for manufacturing a large-scale quartz glass preform performing the mechanical processing with a high precision machine, i.e., integrating a core rod for an optical fiber under a rod in process with a quartz glass tube, a tube diameter of which is controlled by heating, hot drawing or hot drawing with pressure by using a tool-free drawing method.

3 Claims, 5 Drawing Sheets

5,837,334

LARGE SIZED QUARTZ GLASS TUBE, LARGE SCALE QUARTZ GLASS PREFORM, PROCESS FOR MANUFACTURING THE SAME AND QUARTZ GLASS OPTICAL FIBER

This is a continuation of application Ser. No. 08/154,692, filed Nov. 18, 1993, now abandoned.

BACKGROUND OF THE INVENTION

1. Field of the Invention

The present invention relates to a large sized quartz glass tube having a large diameter and a thick wall and a preform for use of an optical fiber having low eccentricity and excellent transmission characteristics, yet suited for a low cost mass production. More particularly, it relates to a large-scale quartz glass preform fabricated by integrating a synthetic quartz glass tube with an optical single mode fiber core glass rod using a rod-in-tube technique, to a process for manufacturing the same, and to an optical fiber obtained from the preform.

2. Prior Art

Since several years quartz glass optical fibers (hereinafter simply called optical fibers), more particularly, single mode optical fibers are put into practical use and a large number thereof is consumed. The optical fibers are fabricated principally by VAD (vapor-phase axial deposition) method, OVD (outside vapor-phase deposition) method as described in U.S. Pat. No. 3,932,162 and the like and MCVD (modified chemical vapor deposition) method as described in U.S. Pat. No. 4,217,027. The products obtained thereby account for most of the world fiber market. However, the application field of the optical fibers has been expanding, and the fibers at present are not only used as long distance mains but also in the general use customer line systems. It is therefore foreseen that the demand for a still larger number of optical fibers will grow in near future. It is predicted, however, that the productivity and the cost would each face limits so long as the optical fibers are fabricated by the three conventional methods enumerated above.

Because, it has passed 20 years since the research on optical fibers began, study on transmission characteristics and reliability has thoroughly been completed. It seems, therefore, to be quite difficult to develop a novel low cost process suited for mass production without impairing the transmission characteristics and reliability.

If the preform can be scaled up and the productivity per apparatus can be increased, mass production would be realized. Moreover, further cost reduction is expected at the same time, because the cost for evaluation and the prevention of forming irregular products would be considerably reduced. The three principal processes above certainly provide high quality optical fibers, however, considering that they originally are small laboratory scale processes, they can not meet the demand of a low cost mass production because they are not suited for a scaled up fabrication. This fact can be more specifically depicted; a single preform obtained by MCVD method can provide an optical fiber of merely from 15 to 30 km in length, and a preform produced by VAD or OVD method can provide an optical fiber from 100 to 200 km in length.

The three methods described above are certainly the best for producing the transmission part of the fiber. However, simultaneous production of the cladding layer in a single process is far from being beneficial from the both viewpoints of reducing cost and increasing productivity. It has been considered as one of the excellent manufacturing methods to produce separately the clad portion which accounts for as large as 80% or more of the cross sectional area of the optical fiber by a low cost efficient process and combine it in the aforementioned three conventional methods, for example, as in the fabrication of a graded index fiber or a single mode fiber. The process based on the concept above have already been carried out, for example, as a process for synthesizing and depositing a clad portion by an OVD method on a core glass rod produced by a VAD method. This process, however, suffered from poor synthetic deposition efficiency of the cladding layer onto the core glass rod, because a fine and short core glass rod was used. Furthermore, it was not a low cost process and far from being applicable for mass production because it was requisite to synthesize each of the core glass rods.

Accordingly, the present inventors conducted further studies concerning the points described above to find as a result that the problems can be overcome by efficiently producing the cladding layer alone separately from the core glass rod, and finally combining it with the rod again which was formed by the process well known to the art. It has been therefore concluded that the rod-in-tube is best suited for such a process.

There are, however, still problems to be solved on the rod-in-tube process. In a conventional rod-in-tube process, the conventional quartz glass tubes were so small as to have an outer diameter from 15 mm to 30 mm$\phi$ and thickness in the range from 1 mm to 6 mm; moreover, the dimensional precision was as low as to yield fluctuations in outer diameter of about 10% and in thickness of 20% to 30%. However, in inserting a core glass rod inside such a tube in accordance with the rod-in-tube technique, a clearance of some mm depending on the length and the size of the tubes or the degree of skill was required to avoid contact of the rod with the inside wall of the glass tube. It can be seen that those inconveniences, i.e., too small a tube diameter, a poor dimensional precision, and a necessity of a large clearance, in combination caused decentering to occur on the preform. This resulted as a large eccentricity on the optical fiber. The rod-in-tube technique has been thought to be no advantage in the fabrication of the optical fiber assuming the joint loss of single mode optical fibers in the total joint work of multiple cores.

Since the properties of the core glass rods inserted in the quartz glass tube vary even though the same fabricating conditions are maintained, and also vary depending on the fiber specification, user, and manufacturing process, it is necessary to make high precision quartz glass tubes of differing dimension. Forming such various types of quartz glass tubes of differing dimension by mechanically griding et al. requires a lot of work-time and is very far from a low cost mass production. As means of forming various types of quartz glass tubes, a hot drawing process were considered. However, because a small deviation of a formed tube was greatly amplified when it was drawn, it was difficult to make the tube of the predetermined dimension with precision.

In addition to the aforementioned problems, the rod-in-tube technique was suffered still more from problems such as generation of bubbles and inclusion of impurities at the welding interface between the internal wall of the quartz glass tube and the outer surface of the core glass rod. This problem was not only subject to the atmosphere and the cleaning method employed in the rod-in-tube technique, but also subject to the finishing of the internal surface of the quartz glass tube.

In the light of the circumstances described hereinbefore, the present inventors have extensively studied to overcome the problems. As a result, it has been found that the well established three processes may be modified for scaling up the preform by integrating a thick quartz glass tube having a large diameter with an optical fiber core glass rod using a rod-in-tube technique. This modified process provides large preforms having an improved quality with respect to eccentricity and the like if used as a single mode optical fiber. At the same time, the process is low cost and suited for mass production. The problems enumerated above with respect to the rod-in-tube technique have been solved by utilizing a high precision industrial machine in manufacture process of a large-sized primary treated quartz glass tube which comprises first perforating a large-sized quartz glass ingot or tubular glass product using a core drill perforator of the drilling machine (commercial name, made of Ueda Technical Institute), a peripheral grinder, or a high precision horning process described in Cho-seimitsu Kakou Gijyutsu (High Precision Machining), Cho-seimitsu Kakou Kenkyu-kai (Ed.), (1984) p. 421, Kogyo Chosakai Publishing Co., Ltd.; then mechanically grinding, drilling and polishing the inner and outer surface of the resulting tube to finish the tube at high dimensional precision; removing surface stains, machining strains, and surface roughening by an etching method using hydrofluoric acid; further drilling the resulting quartz glass primary tube by pressing-in a hot carbon drill (referred to hereinafter as a "hot carbon drill-in process"), and then heat-treating the resulting quartz glass primary tube using Tool-Free Drawing method shown in Application Technology of High-Purity Silica, page 106; finally collapsing the resulting quartz glass primary tube onto the above optical fiber core glass rod to form a solid preform by using the rod-in-tube technique. Those processes enable fabrication of a preform which can yield a successive optical fiber of high quality as long as 3000 km at maximum. Especially, where a synthetic quartz glass in which foregin substances and impurities were removed and dehydrated, and had a controlled refractive index was used as raw materials, the best properties may be given to an optical fiber. The present invention has been accomplished based on those findings.

SUMMARY OF THE INVENTION

An object of the present invention is to provide a high precision large-sized and thick quartz glass tube.

Another object of the present invention is to provide a large-scale quartz glass preform which enables low cost mass production of optical fibers.

Another object of the present invention is to provide a high precision large-scale quartz glass preform which enables manufacture of elaborate optical fibers.

Another object of the present invention is to provide an elaborate optical fiber made of the high precision large-scale quartz glass preform.

Another object of the present invention is to provide a process for manufacturing the aforementioned high precision large-sized and thick quartz glass tube.

Another object of the present invention is to provide a process for fabricating a large-scale quartz glass perform utilizing the aforementioned large-sized quartz glass tube.

To accomplish the above objects, there is provided a large-scale preform in accordance with the present invention having low eccentricity and low generation of bubbles at the welding interface between the rod and the tube, reducing cost and increasing productivity, which can be used for elaborate optical fibers.

DETAILED DESCRIPTION OF THE INVENTION

Figure 1:
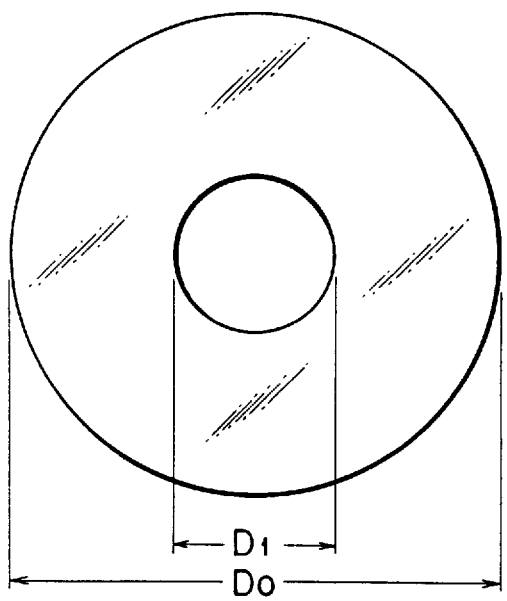
FIG. 1 shows a horizontal cross-sectional view of a large-sized quartz glass tube in accordance with the invention.

The present invention refers to a large-sized quartz glass tube being from 50 mm to 200 mm$\phi$ in outer diameter, 10 mm or more in thickness, from 1.1 to 7.0 in ratio of the outer diameter to the inner diameter and 2% or less in error thickness; and a large-scale quartz glass preform fabricated by a rod-in-tube technique comprising integrating the resulting quartz glass tube with an optical core glass rod using a rod-in-tube technique; and an optical fiber drawn from the preform. The resulting preform is fabricated by the process which comprises mechanically griding outer surface or outer and inner of quartz glass mother material with high precision, and then integrating a quartz glass tube which is finished to be an inner surface roughness of 20 $\mu$m or less with an optical fiber core glass rod using a rod-in-tube technique. The terms referred herein are defined below as follows:

(1) A "large-sized quartz glass tube" refers to a tubular quartz glass in general including a natural quartz glass tube and a synthetic quartz glass tube manufactured for use of a rod-in-tube.

(2) A "quartz glass mother material" refers to a large-sized quartz glass material of long size cylindrical ingots or tubular large-scale quartz glass produced by a high purity natural quartz glass or a synthetic quartz glass; and a quartz glass, the outer surface of which is roughly finished if necessary, before processed to the desired dimension;

In the case of a synthetic quartz glass, the OH groups and the refractive index (n) of the tube are controlled in accordance with the designed quality of the products. The refractive index difference ($\Delta$n) is controlled within 0.02%;

(3) A "quartz glass primary tube" refers to a large-sized quartz glass tube having a desired dimension obtained by mechanically grinding and perforating a cylindrical quartz glass mother material using a core drill perforator, or perforating and tubing the same mother material by hot carbon drill-in process, or by synthesizing the quartz glass into a tubular shape and then roughly grinding the outer and the inner surfaces thereof;

(4) A "primary treated quartz glass tube" refers to a large-sized quartz glass tube having its inner and outer diameters accurately determined to control the thickness within an error of 2%, and which has been controlled the inner surface roughness to 20 μm or less after HF-etching treatment;

(5) A "heat-treated quartz glass tube" refers to a large-sized quartz glass tube obtained by further subjecting the primary treated quartz glass tube to heat treatment, heating and drawing, or heating and drawing treatment under pressure in accordance with a Tool-Free Drawing method; accordingly, it refers to a synthetic quartz glass tube having its surface heat treated and,or to a tube having differing diameter with that of the primary treated quartz glass tube;

(6) A "thickness error" signifies a value defined by equation as follows:

$$[(t_{max.}-t_{mini.})/(t_{max.}+t_{mini.})/2]\times 100(\%)$$

where, $t_{max.}$ is the maximum thickness of the tube and $t_{mini.}$ is the minimum thickness of the tube, the value of which are obtained by measuring the thickness (t) of the predetermined length of a large-scale quartz glass at, for example, 5 or more points in the longitudinal direction thereof, or rotating the resulting tube and thereby measuring it at 50 mm–100 mm's interval and representing the maximum value as percentage along the total length;

(7) A "Tool-Free Drawing method" refers to a method which comprises melt adhering a dummy tube to the primary treated quartz glass tube and drawing down the tube through a computer-controlled heating zone by means of drawn wheels. In this manner, the primary treated quartz glass tube can be subjected to a non-contact heat treatment, heating and drawing, or heating and drawing under pressure.

(8) An "optical fiber core glass rod" refers to a glass rod which is an optical waveguide part consisting of a core portion and an optical clad portion, including the core sufficiently deposited by a synthesized clad when the optical waveguide is used for a public communication system such as a single mode waveguide or multi mode waveguide requiring high quality, or moreover the cladded core jacketed a cladding layer synthesized by OVD method or a quartz glass tube, and impossible to draw a fiber up to the standards.

The quartz glass tube for use in the rod-in-tube technique is a large-sized tube from about the above mentioned large-sized quartz glass tube,and is a large-scale tube having from about 50 to 300 mmφ in outer diameter made from quartz glass satisfying quality features required for clad tube of optical fibers. A large-diameter and thick quartz glass tube can reveal reduced dimensional error. The eccentricity of the optical fiber which is drawn from a large-scale preform fabricated by a rod-in-tube technique, can be not only reduced, but also realized with much effectiveness a low cost mass production.

The larger an outer or the ratio of an outer to an inner diameter is, the more precisely can be fabricated the optical fiber, because the absolute value becomes large depending on the thickness of the tube. On the contrary, the smaller an outer or the ratio of an outer to an inner diameter is, the more the error increases, whereby high precision in size will be required on a reactive tube adjacent to a core for use of an MCVD method and a small-diameter and thin tube for a multi jacket.

Figure 2:
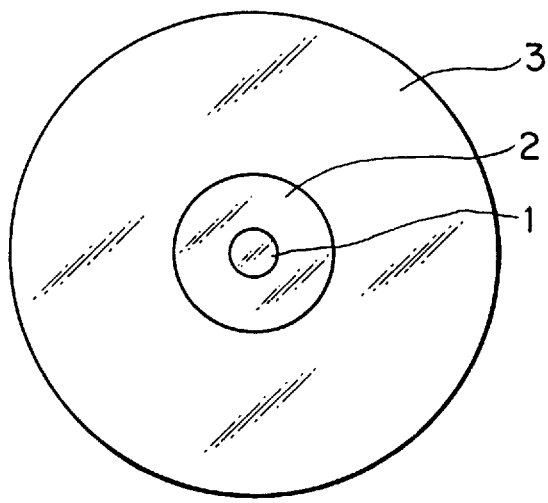
FIG. 2 shows a horizontal cross-sectional view of a large-scale quartz glass perform for a single mode fiber in accordance with the invention fabricated by using the large-sized quartz glass tube.

FIGS. 1 and 2 respectively show horizontal cross-sectional views of a large-sized quartz glass tube and a large-scale quartz glass preform according to the present invention.

Referring to FIG. 1, $D_o$ represents an outer diameter and $D_i$ represents an inner diameter. Referring to FIG. 2, numeral 1 represents a core glass rod, numeral 2 a cladding layer and numeral 3 a sealed large-sized quartz glass tube.

Figure 3:
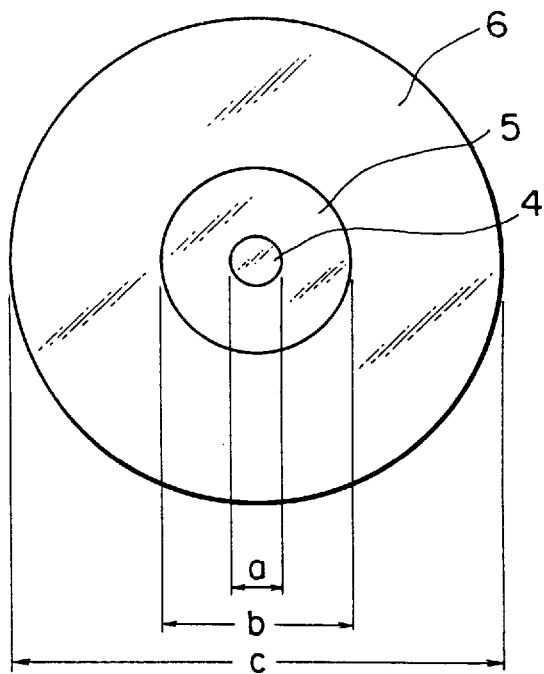
FIG. 3 shows a horizontal cross-sectional schematic view of an optical fiber made of the preform for a single mode fiber shown in FIG. 2.
Figure 4:
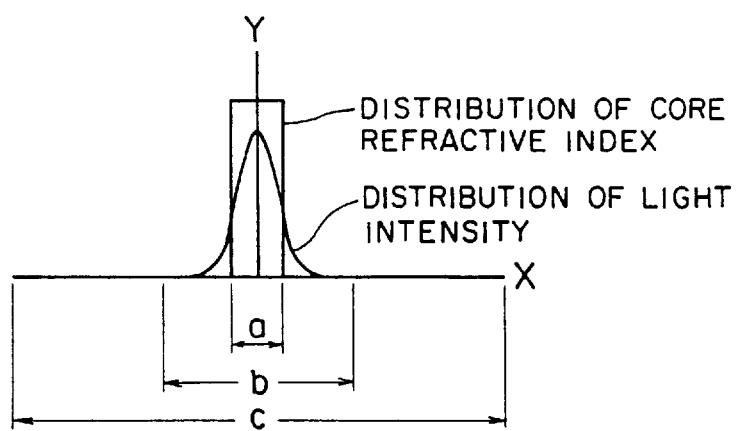
FIG. 4 shows a diagram of both distributions of refractive index and light intensity of the single mode fiber.

FIG. 3 shows a horizontal cross-sectional schematic view illustrating an optical fiber, for example, a single mode fiber drawn from the above mentioned large-scale quartz glass preform. In FIG. 3, numeral 4 represents a core, numeral 5 an optical cladding layer and numeral 6 an over cladding layer, while "a" shows a core diameter ($d_{core}$), "b" an optical cladding diameter ($d_{cladi}$) and "c" an outer diameter ($d_{clado}$) of an optical fiber i.e. 125 mm. The distributions of refractive index and light intensity of the resulting single mode fiber are shown in FIG. 4. In FIG. 4, the optical cladding portion is the part where the power of light spreads out outside the core diameter ($d_{coreo}$). The optical cladding diameter ($d_{cladi}$) therefore includes the cladding layer synthesized together with a core at the same time. The thickness of the optical cladding diameter should be varied depending on such conditions as the shape of the core refractive index distribution, the refractive index difference (Δn), use of a fiber. The value which multiplied actual results by safety index is usually used as the optical cladding diameter. The optical quartz glass core rod of the present invention signifies the quartz glass stick having an optical cladding portion of FIG. 4.

As aforementioned, because the optical fiber of the present invention is drawn from a large-scale preform, the ratio $d_{clado}/d_{cladi}$ of the outer diameter ($d_{clado}$) of the optical fiber of FIG. 3 to the optical cladding diameter ($d_{cladi}$) thereof is approximately proportional to the ratio $D_o/D_i$ of the outer diameter ($D_i$) to the inner diameter ($D_i$) of the large-sized quartz glass tube of FIG. 1 which fabricates the large-scale preform of FIG. 2. Accordingly, it is necessary to design optical fibers according to the $D_o/D_i$ as the guideline. For example, assuming that the core diameter of a single mode fiber (for 1.3 μm wave length band) is 9 μm, that of GI type multimode fiber is 50 μm and the outer diameter of an optical fiber is 125 μm, $D_o/D_i$ will become values shown in Table 1.

TABLE 1

| $d_{cladi}$ (μ) | $d_{cladi}/d_{core}$ | $(d_{clado}/d_{cladi})$ ≈ $(D_o/D_i)$ | reference |
|---|---|---|---|
| 9 | 1 | 13.89 | $d_{clado}$ & $d_{cladi}$ the same, impossible design |
| 18 | 2 | 6.94 | minimum cladding layer |
| 27 | 3 | 4.63 | practical range |
| 45 | 5 | 2.77 | " |
| (50) | (1.0) | (2.50) | (for multimode use a little cladding required) |
| (60) | (1.2) | (2.08) | (practical range as multimode fiber) |
| 72 | 8 | 1.74 | ranges when jacketed twofold~multifold |
| 90 | 10 | 1.39 | ranges when jacketed twofold~multifold |
| 100 | 11.1 | 1.25 | ranges when jacketed twofold~multifold |
| (114) | 12.7 | 1.10 | ranges when jacketed twofold~multifold |
| 125 | 13.9 | 1.00 | the most outer portion | note:
( ) is multi-mode fiber

In accordance with table 1 above, for example, $D_o/D_i$ becomes 2.5 or less if a fiber is a multimode fiber, usually, the ratio of cladding layer simultaneously sized together with the core to the core is 5%–30%. Therefore, the optical cladding diameter ($d_{cladi}$) of a fiber having, for example, 20% of cladding layer is 60 μm and $D_o/D_i$=2.08. If it is a single mode fiber, it is requisite that $D_o/D_i$ is below 7, to obtain a practical fiber. That is, the power distribution of 1.3 μm band (such as matched cladded types, deplest types), 1.55 μm band and dispersion shift types is assumed to be about 20 μm or less, respectively. A $d_{cladi}/d_{core}≈3$ or more, i.e. $D_o/D_i≈4.63$ is utilized as practical ranges being taken account for a safety ratio. $D_o/D_i$ also will be a lower value when the preforms are jacketed by twofold or threefold. Selecting $D_o/D_i$ in the range from 1.1 to 7 is necessary conditions for fabricating a practical fiber. It is just natural that some slits between a quartz tube and a core rod must exist in the case of designing a quartz glass tube for a rod-in-tube technique, because $D_o/D_i$ is the ratio of the preform.

In forming a large-sized quartz glass tube from the quartz glass mother material, various types of known processes for treating naturally occurring quartz can be utilized. For example, a pot melt pulling process and a mold shaping process may be useful. However, it is difficult to form a tube having a large diameter by utilizing the pot melt pulling process. In case of utilizing the pot melt pulling process, the heat-resistant material of a crucible in the melting of the material is brought into direct contact with the melt glass for many hours, impurities inside the heat resistant material immigrate into the inner and outer surfaces of the quartz glass by diffusion. Such impurities are unfavorable so that they increase transmission loss of the optical fiber. Therefore, it is necessary to remove the contaminated portion of the core portion when a cladding tube is jacketed adjacent to a core portion.

The following three methods are recommended for manufacturing a large-sized quartz glass tube according to the present invention.

The first method consists of two steps. At the first step, cylindrical quartz glass mother material is prepared. At the second step, the mother material is subject to be either mechanically drilled by using a core drilling perforator as shown in FIG. 5 to make a hole at the center or subject to be contacted for short time by using a hot carbon drill press-in process to make a hole.

The second method is to use the OVD method described in U.S. Pat. No. 2,272,342 wherein a porous silica soot material is deposited on a heat resistant core material, then removed the core, dehydrated and fused the deposit for vitrification.

The third method comprises forming a perforated soot material directly by the VAD method, and then fusing the dehydrated deposit for vitrification.

Figure 5:
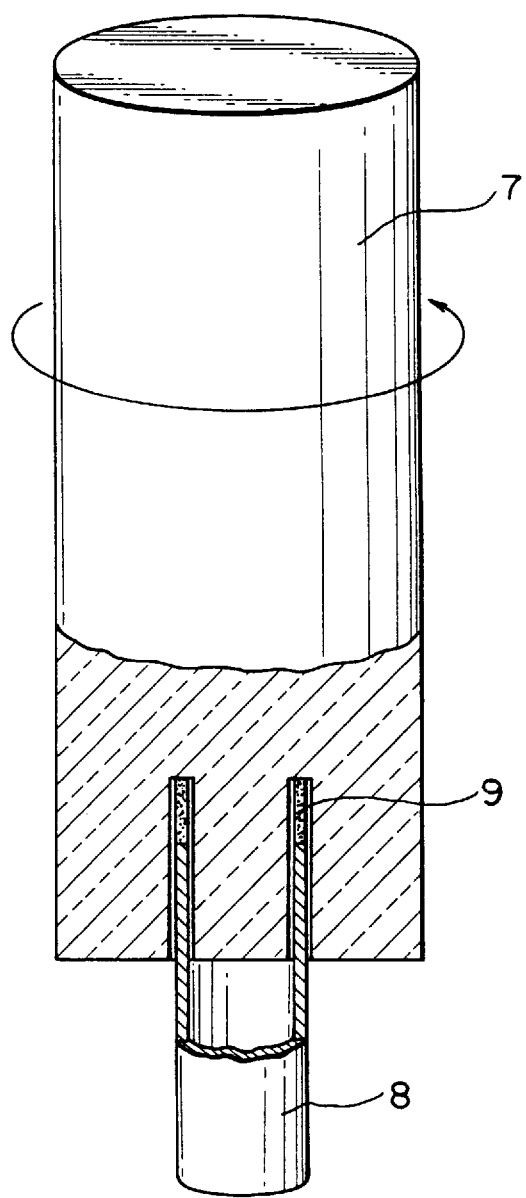
FIG. 5 shows a partially vertical cross-sectional schematic illustration of a manufacturing method for a large-sized quartz glass tube using a core drilling perforator, which is a preferred embodiment of the invention.
Figure 6:
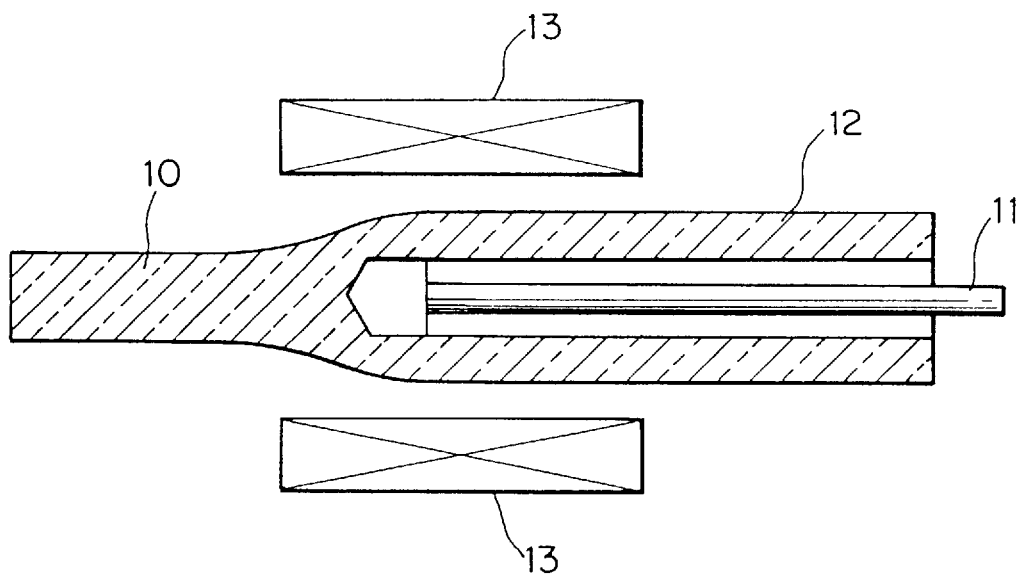
FIG. 6 shows a schematic illustration of a manufacturing method for a large-sized quartz glass tube using a hot carbon drill press-in process, which is another preferred embodiment of the invention.

In FIG. 5, numeral 7 represents a cylindrical quartz glass mother material, numeral 8 a core drill and numeral 9 a grinding stone. FIG. 6 shows a schematic view illustrating a hot carbon drill press-in process wherein numeral 10 represents a cylindrical quartz glass mother material, numeral 11 a carbon drill, numeral 12 a quartz glass primary tube and numeral 13 a thermal heater. If an original dimensional error in thickness of the quartz glass tube for a rod-in-tube technique is so large, the heating and drawing treatment amplifies it to become relatively much larger. Since the multi-coating also expands the error, the precise dimensional adjustment is highly required. A high accuracy quartz glass primary tube made from a quartz glass mother material can be obtained by mechanical grinding. With increasing scale of quartz glass, mechanical grinding, a precision grinding using well known conventional large machines in particular, has been made possible. However, the machining with high precision can be obtained only at the expense of various machining damages such as micro-cracks, crazes, maching strains, etc., which remain on the processed surface, causing a generation of bubbles on the internal interface boundary at the time of integration according to a rod-in-tube technique. To solve the forgoing problems, high accuracy mechanical polishing, inner surface fire polishing or forming a special glass layer on the inner surface have been performed to have roughness of the inner surface in the range of 0.01 mm (Refer to Japan Laid Open Publication No.52-92530).

However, these treatments were so much burdensome that it is practically almost impossible in case of mass production of a large-sized (large diameter, thick or long sized) quartz glass tube. However, it has been realized that the inner surface polishing for a high purity quartz glass primary tube can be achieved by using a precise honing machine.

According to this process, a quartz glass primary tube having 50 mmφ or more in outer diameter and approximately 3,000 mm in length can be entirely processed into a straight tube having a cross section of high circularity. Accordingly, the surface of the resulting tube must be finished by mechanically polishing, with a grinding stone being changed or the grade of a abrasive grains being varied, in order to remove cracks, crazes, strains caused by tension or the like, subjected to HF-etching treatment to relax a concentrated tension.

The tube is further subjected to ultra-sonic washing to remove contaminated materials from the surface, and then controlled to a roughness of 20 μm or less on the inner surface. In other words, the heating treatment can make the surface of the tube smoothly by relaxing a sharp roughness generated under a process of mechanical grinding, releases the strain and restricts a generation of bubbles.

The experiment conducted by the inventors reveals that when the roughness of the inner surface caused by grinding exceeds 20 μm, such damages cannot be relaxed or released by heating and drawing treatments and generate bubbles on the inner surface boundary at the time of integration by using a rod-in-tube technique. A preferred means for finishing the inner surface of the quartz glass tube is a high precision honing process either in case that a cylindrical quartz glass mother material is mechanically drilled with a core drilling perforator or the like to make an opening at the center or is used a quartz glass primary tube which is obtained by roughly grinding mechanically the inner and outer surface of a large-scale tubular quartz glass mother material under a process of OVD method or the like.

As a result, the clearance between the quartz glass tube and the core glass rod can be narrowed. In this manner, the primary tube having its inner surface ground and mechanically polished by high precision honing machine is subjected to peripheral griding to control the thickness to achieve an error falling within 2%. Once the thickness error is controlled to this range, amplification of the error upon drawing can be avoided and hence no unfavorable influences are cast to the eccentricity of the fiber.

A hot carbon drill press -in process is processed in a manner that a cylindrical quartz glass mother material is heated and a carbon drill is pressed at the center of the material. Employing this kind of opening method can provide advantages to easily manufacture a large-sized quartz glass tube having 20 μm, practically a few μm, or less in inner surface roughness without grinding or polishing the inner surface of the quartz glass tube. If the outer diameter of the quartz glass other material exceeds 50 mmφ, the n the eccentricity of its opening portion and the straightness of the tube can be remarkably improved.

Accordingly, if a cylindrical quartz glass mother material having 50 mmφ or more in outer diameter is processed to make an opening at the center under the hot carbon drill press-in process, can be achieved a straight cylindrical tube having 300 mmφ or more in outer diameter and approximately 3,000 mm in length, the cross section of which reveals a high circularity at any position along its longitudinal direction.

The grinding conditions for the outer periphery is not so strict as in the case of inner periphery because the outer periphery is heated directly from the heating zone. Nevertheless, the surface roughness of the outer periphery must be controlled to be at least 200 μm or less, preferably 100 μm or less, by HF-etching treatment to remove or to relax the portion where high tension is concentrated, because the quality thereof influences the fracture strength of the final product i.e. The optical fiber. In controlling the surface roughness, well established machining methods for semiconductor ingots and various types of ceramic materials, such as a standard peripheral grinding or a process using cylindrical grinder may be used.

After the above process, the mechanically processed surface is subjected under a finish polishing process to achieve the thickness error within 2% and HF-etching treatment to obtain a primary treated quartz glass tube with 20 μm or less in inner surface roughness.

The primary treated quartz glass tube is integrated with a core glass rod for an optical fiber by applying the rod-in-tube technique thereto.

The features of the core glass rod vary even though the rod can be produced under the same conditions depending on fiber specifications, users or manufacturing methods.

Accordingly, a plurality of quartz glass tubes with different sizes can be produced by conducting heating and drawing treatment to meet the primary treated quartz glass tube with the core glass rod. In this hot treatment process, the Tool-Free Drawing process is employed to prevent an adhesion of impurities.

Figure 7:
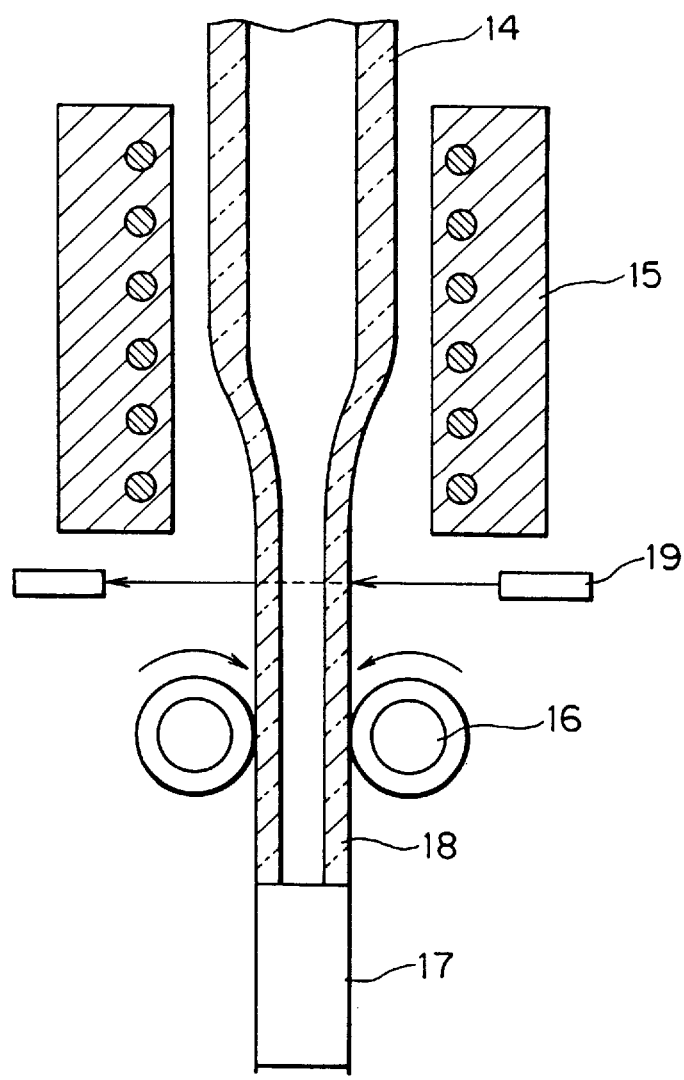
FIG. 7 shows a schematic illustration of a manufacturing method for a large-scale heat-treated quartz glass tube by applying a Tool-Free Drawing Method to a primary treated quartz glass tube, which is also another preferred embodiment of the invention.

FIG. 7 shows a schematic view illustrating a Tool-Free Drawing process wherein numeral 14 represents a primary treated quartz glass, numeral 15 a heating source, numeral 16 a drawing roll, numeral 17 a dummy tube, numeral 18 a heat-treated quartz glass tube and numeral 19 a sensor.

For realizing the desired dimension with high precision using the process, drawing and inner pressure must be applied. The pressure must be varied according to the dimension and thickness of the primary treated tube, the viscosity of the glass on heating, and the drawing ratio; to achieve the dimension with a higher precision, the process should be conducted as such that the ratio $(D_o/D_i)/(d_o/d_i)$ fall in the range from 1.0 to 1.5, wherein $D_o$ and $D_i$ represent each the outer and the inner diameter of the primary treated synthetic quartz glass tube, respectively, and $d_o$ and $d_i$ represent each the outer and the inner diameter of the heat-treated tube, respectively. If the ratio above falls below 1.0, the tube may accompany deformation on heat treatment, and if the ratio exceeds 1.5, the thickness error becomes so large that the tube may cause burst depending on temperature conditions. Hence, a quartz glass tube with dimensional precision would not be expected if the ratio falls outside the defined range. In particular, if the ratio approaches 1.5, the thickness error must fall absolutely with in a range of 2%.

The heat treatment for tubes of from 50 mm to 300 mmφ in diameter must be conducted in the temperature range from 1600° C. to 3000° C., preferably from 2000° C. to 2800° C. because of economic reasons. If the heat treatment is carried out at a temperature lower than the above defined range, the primary treated quartz glass tube cannot be sufficiently softened; if it is carried out at a temperature higher than the defined range, the primary treated tube may suffer degradation or may be fluidized. In either case, a high dimensional precision can no longer be maintained. The ratio $D_o/D_i$ or $d_o/d_i$ represents the cladding layer thickness of a single mode optical fiber. In a single jacketed optical fiber, the above ratio must be in the range of from 2 to 7; in an optical fiber with 2 or more jackets, the above ratio should be in the range of from 1.1 to 3.

The quartz glass tube thus obtained has been heat-treated in the high temperature range from 1600° C. to 3000° C. so that various damages, such as roughness and work distortion of the ground surface caused by mechanical griding, can be relaxed or released. In particular, the larger be deformed by thermal rolling, the larger grow flaws, cracks and pits on the surface so that the grooves will become shallow and loose their acute angle portions.

Accordingly, can be omitted some processes which have been unsuitable for mass production but necessitated for manufacturing a quartz glass tube for use of a rod-in-tube, such as a high precision mechanical grinding process, an inner surface fire polishing process and a process to form a special glass layer on the inner surface.

Thus, the target large-seized quartz glass tube can be efficiently obtained by thermally deforming a large-sized high precision primary treated quartz glass tube.

The manufacturing method for natural quartz glass in accordance with the present invention comprises the steps of selecting good quality portions of a clod of natural crystal glass, further picking out the central portions by removing the periphery of each crystal clods, making each particle diameters uniform by smashing the clods and removing impurities by chemical treatment after removing foreign substances. Then, thus treated material is subject to well known conventional methods, such as a pot melt pulling method or a mold shaping method which have been widely used for long time.

However, the method for manufacturing a large-scale cylindrical quartz glass mother material by Verneuil process using an oxyhydrogen flame is recommended as the best method for manufacturing quartz glass material for an optical fiber because the impurities are least contained.

Although various methods can be applied for manufacturing a synthetic quartz glass ingot or a tubular member such as that described in the aforementioned "Application Technology of High-Purity Silica" at pages 100 to 104, a high temperature vapor-phase Verneuil process, which directly synthesizing a glass ingot from gaseous silicon compounds, e.g., $SiCl_4$, using an oxyhydrogen flame, is unsuitable for producing optical fiber material because the synthetic quartz glass obtained therefrom contains OH groups at a high concentration over 800 ppm.

Accordingly, the glass ingots obtained by this process are frequently used as photo mask substrates for semiconductors and as optical members for exposure devices. The plasma process, which is a modified Verneuil process, is for producing special use articles such as high purity core glass for optical fibers, because it consumes large electric power and is hence a costly process. In contrast to the aforementioned two processes, there is known another process as an appropriate one free from the above shortcoming for manufacturing mother materials in accordance with the present invention, which comprises depositing a porous soot material on a rotating substrate (target) by blowing a material gas while lowering the flame temperature, subjecting the soot material to dehydration and the like, and finally vitrifying the treated soot material. One of such processes, i.e., a VAD method, provides principally a solid cylindrical quartz glass mother material. Another one, i.e., an OVD method, enables tubular glass products by direct synthesis.

The synthetic quartz glass mother material for use in the present invention preferably is produced from a porous soot material, because the OH groups and the refractive index can be controlled as desired to meet the demands depending on the cladding portion of the core glass rod to be used in the process. A large aperture preform having 75 mmφ or less in diameter can be directly obtained not only from a quartz glass tube having approximately 75 mmφ in diameter, but either to re-draw a larger preform or to directly produce the preform of the desired outer diameter by simultaneously conducting drawing with the integration of the quartz glass tube and the core glass rod in the rod-in-tube technique.

The selection of a mode field diameter, a cut off wavelength, and a dispersion is important for a single mode core glass rod. With the recent increase in quality, it is often the case to find scattered characteristic values when the produced core glass rods are used as they are. Accordingly, it is preferred that the clad thickness of the core glass rod is first controlled before jacketing, and then applying fine adjustment by etching and the like after once preparing the rod into a preform.

High precision adjustment can be made on a large-scale quartz glass preform because of its wide adjustment range.

EXAMPLE 1

A large scale porous quartz soot material was produced by vapor phase axial deposition (VAD) method which comprises evaporating $SiCl_4$; frame hydrolyzing the $SiCl_4$ gas in an oxyhydrogen flame burner to produce the soot of $SiO_2$; depositing it on a rotating quartz rod. The resulting soot material was dehydrated by heating it in a mixed gas system of He and $Cl_2$ inside an electric heating furnace, which was subjected to zone melting process at 1550° C. to obtain a fused glass. Thus, was obtained a large cylindrical quartz glass mother material. The periphery of the quartz glass ingot was roughly so as to adjust the dimention by using a peripheral grinder equipped with #80 grinding stone, after the both ends were cut, and then the center thereof was perforated with a core drill equipped also with a #80 grinding stone. Thus, was obtained a synthetic quartz glass primary tube about 10 kg in weight, 94 mmφ in outer diameter, 30 mmφ in inner diameter with an outer to inner diameter ratio of 3.13 about 32 mm in wall thickness, and 730 mm in length.

The internal surface of the resulting primary tube was wholly machined along the length direction using an automatic long honing machine for high precision finishing to obtain a long tube having a hole with a cross section of high circularity being drilled straight along the longitudinal direction. The polishing degree was gradually increased by changing abrasive stones to finish with #800. The outer periphery of the tube was then ground using an NC peripheral grinder so that the center of the outer diameter may conform with that of the inner diameter. After it was confirmed that the tube is finished to a thickness falling within an error of 2%, the outer periphery was finished with #140. The tube was etched in a hydrofluoric acid cell of 5% to 30% in concentration while checking the surface. This step is necessary for removing surface stains and relaxing surface machining stress. A primary treated synthetic quartz glass tube was finally obtained by washing the etching-finished tube with pure water. The primary treated tube thus obtained was 91.5 mmφ in outer diameter, 32.4 mmφ in inner diameter with an outer to inner diameter ratio $D_o/D_i$ of 2.82, 29.55 mm in thickness, 730 mm in length, and 9.2 kg in weight. The thickness error ($t_{max.}-t_{mini.}$) was 0.48 mm (1.62%). Furthermore, the surface was examined for roughness by traveling a contact type compact roughness meter for 8 mm along the longitudinal direction to find an $R_{max.}$ of 4.8 μm for the inner surface and 53 μm for the outer surface.

Separately, a 1.3-μm wavelength single mode core glass rod having a refractive index difference (Δn) of 0.343% between a core and a clad was produced by VAD method. This core glass rod having a dimension of 54.5 mmφ in outer diameter including adhesion of the clad, and 455 mm length. The rod was hot drawn to an outer diameter of 30.1 mm by using an automatic precision drawing machine equipped with an outer diameter controller and designed as such to have a cut-off wave-length $\lambda_c$ of 1.25 μm. After slightly etching the outer surface, the rod was fuse cut at a length of 730 mm. The core glass rod thus obtained was then carefully inserted into the above primary treated synthetic quartz glass tube and fixed therein by matching the center thereof with that of the glass tube. The both ends of the resulting assembly was connected to a dummy quartz material and rotated to straighten any bends or twists. This assembly was then inserted into a vertical electric heating furnace from the upper side to fuse the front end at 2180° C., and the pressure therein was reduced using a vacuum pump. The rod-in-tube assembly was moved under varying speed while controlling separately the temperature in the range from 2000° C. to 2800° C. and the vacuum degree in the range from 200 mm to 1000 mmAq to examine for the formation of air bubbles at the boundary. A preform was obtained by slowly traveling the whole at a rate of 2 mm/min so that no air bubbles might be formed. Thus, was obtained a preform under a stable condition, which was 90.2 mm in diameter, 595 mm in length, and 8.3 kg in weight. Thus, yields fibers as long as about 300 km. A part of the resulting preform was hot drawn to an outer diameter of about 50 mmφ, and was subjected to observation using a preform analyzer. The step difference in refractive index at boundary between the cladding layer and the rod was not more than 0.01%, and the eccentricity was 0.153 mm (0.34%).

The preform was further drawn into a fiber about 5 km in length and 125 mm in outer diameter using a drawing machine. The fiber characteristics of the resulting product was measured every 1 km long to obtain as average values, an eccentricity of 0.22 μm, a cut-off wavelength $\lambda_c$ of 1.285 μm, a transmission loss for 1.3 μm wavelength of 0.355 dB/km, and an OH group loss for 1.38 μm wavelength of 0.86 dB/km. The product was found to have excellent characteristics for a single mode optical fiber.

EXAMPLE 2

A primary treated synthetic quartz glass tube having 93.5 mmφ in outer diameter ($D_o$), 31.6 mmφ in inner diameter ($D_i$), a ratio of the outer diameter to the inner diameter of 2.96, 30.95 mm in thickness with a thickness error ($t_{max.}-t_{mini.}$) of 0.42 mm(1.36%), 700 mm in length and 9.3 kg in weight, was produced in the same manner as of Example 1.

Further, the surface was examined for roughness by traveling a contact type compact roughness meter for 8 mm along the longitudinal direction to find an $R_{max.}$ of 8.5 μm for the inner surface and 68 μm for the outer surface.

The primary treated synthetic quartz glass tube was then heated to 2200° C. in a vertical heating furnace to weld the bottom end portion and hot drawn under pressure as shown in FIG. 6 while flowing an inert gas inside and outside the tube. In this manner, five types of heat treated synthetic quartz glass tube were obtained as shown in Table 2. The internal surface roughness $R_{max.}$ was found to be considerably reduced after the heat treatment.

Separately, a single mode core glass rod having a refractive index difference (Δn) of 0.335% was produced by VAD method. The core glass rod processed to fit each of the five heat treated synthetic quartz glass tubes shown in Table 2 as the cladding layer. Accordingly, the outer periphery of the core glass rod was etched and hot drawn to obtained each of the core glass rods shown in Table 2. Each of the core glass rods was inserted into the corresponding heat treated synthetic quartz glass tube to give each a rod-in-tube structure, and then hot integrated by heating in an electric heating furnace to give a preform. No step difference in refractive index was observed between the cladding layer and the rod upon measuring with a preform analyzer.

that used in Example 1. The boundaries were also observed and the results are given collectively in Table 3.

TABLE 3

| Sample No. | 7 | 8 | 9 | 10 | 11 |
|---|---|---|---|---|---|
| Abrasives | None | #800 | #400 | #140 | #80 |
| Roughness after Etching ($R_{max.}$) (μm) | <1.2 | 4.5 | 16.4 | 26 | 68 |
| State of Boundary | No bubbles | No bubbles | Few bubbles | Fine bubbles | Various bubbles |

TABLE 2

| Sample No. | Heat - treated Quartz Glass Tube | | | | | Outer Diameter of Core Glass Rod (mm) | Outer Diameter Preform (mm) |
|---|---|---|---|---|---|---|---|
| | Outer Diameter ($d_o$) (mm) | Inner Diameter ($d_i$) (mm) | $d_o/d_i$ | $\overline{(D_o/D_i)}$ $(d_o/d_i)$ | $R_{max}$ (μm) | | |
| 1 | 36 | 13.9 | 2.59 | 1.14 | <1 | 12 | 35 |
| 2 | 48 | 18.2 | 2.64 | 1.12 | <1 | 16 | 47 |
| 3 | 62 | 22.6 | 2.74 | 1.08 | <1 | 20 | 61 |
| 4 | 75 | 26.9 | 2.79 | 1.06 | <2 | 25 | 74 |
| 5 | 92 | 32.6 | 2.82 | 1.05 | <4 | 30 | 91 |
| 6 | 93.5 | 31.6 | 2.96 | 1.0 | 8.5 | — | — |

A primary optical fiber 125 mm in diameter was produced from a 62-mmφ diameter preform No. 3 in Table 2, and the fiber characteristics thereof were measured. It has been found as a result to be high quality optical fiber yielding a cut off wavelength λ c of 1.245 μm, a transmission loss for 1.3 μm wavelength of 0.334 dB/km, and an eccentricity of 0.32 μm.

EXAMPLE 3

A large porous soot mother material having produced by vapor phase axial deposition (VAD) method was dehydrated and vitrified in accordance with the process as described in Example 1. The resulting product was heat dehydrated, vitrified and roughly ground in the same manner as described in Example 1 to obtain a cylindrical quartz glass mother material (ingot) about 820 mm in length and having an outer diameter of 96 mmφ.

This ingot was perforated at the center using a hot carbon drill press-in process. A higher dimensional precision was then achieved by peripheral grinding followed by etching with hydrofluoric acid solution. The synthetic quartz glass primary tube weighing about 11.5 kg at this point was found to have an outer and inner diameters of 101 mmφ and 40 mmφ, respectively, a ratio of the outer diameter to the inner diameter of 2.525 and a length of 775 mm. Because the internal surface of the tube perforated was fused by pressing-in a hot carbon drill, no defects such as cracks ascribed to mechanical impact or grinding damage, crazes, machining stress, and the like, were observed.

The inner surface roughness of the above primary treated synthetic quartz glass tube was mechanically polished with a honing machine by changing the abrasive degree every 150-mm length. The mechanically polished surface was then etched with a hydrofluoric acid solution to obtain samples given in Table 3. Core glass rods about 38 mmφ in diameter were inserted into the primary treated synthetic quartz glass tubes to obtain a preform assembly in the same process as that used in Example 1. The boundaries were also observed and the results are given collectively in Table 3.

EXAMPLE 4

A large porous soot material having produced by outside vapor-phase deposition (OVD) method was dehydrated, subjected to treatment for refractive index adjustment, and vitrified to obtain tubular synthetic quartz glass mother material. The both peripheries of the quartz glass mother material were severed and the outer surface thereof were roughly ground by using a peripheral grinder equipped with #80 grinding stone to achieve substantially the predetermined outer diameter. The internal surface of the resulting tube was wholly polished by using a honing machine equipped with #80 grinding stone. The polishing degree was gradually increased by changing grinding stones to finish with #140, #400 and #800, respectively. Then, thus treated tube was examined for thickness deviation by traveling an ultrasonic thickness meter for 50 mm along the longitudinal direction to achieve 8 measuring points around each of the circumferences. The error thickness thus obtained was figured by using a computer. The outer peripheral of the tube was then ground by using an NC peripheral grinder. After it was confirmed that the tube is finished to a thickness falling within the predetermined eror, the tube was etched in a hydrofluoric acid solution. The large primary treated synthetic quartz glass tube thus obtained was a large sized quartz glass cylinder having an outer diameter of 164 mmφ, an inner diameter of 58.9 mmφ with an outer to inner diameter ratio $D_o/D_i$ of 2.78, a thickness of 52.55 mm with a thickness error of 440 μm (0.84%), a length of 1,870 mm, and a weight of about 75 kg. This primary treated tube was found to have surface roughness $R_{max.}$ of 3.5 μm for the inner surface and 77 μm for the outer.

Separately, large quartz core glass rods for single mode operation were produced by VAD method for use in combination with the primary treated synthetic quartz glass tube obtained above. Three rods having similar characteristics were selected from the thus produced rods. The core diameter necessary for the core glass rods to fit the primary treated synthetic quartz glass tube was calculated, and a part of the cladding was etched to adjust the rod diameter. The resulting three core glass rods were fuse joined, drawn to approximately the same outer diameter (55 mmφ), etched, and then the entire surface thereof was fire-polished.

The core glass rod thus obtained was inserted into the large primary treated synthetic quartz glass tube and fixed. The assembly thus obtained was heated at the temperature range from 2000° C. to 2800° C. in a vertical electric heating furnace to fuse and soften it from the lower end, and at the same time, traveling it while controlling the temperature and the vacuum degree to a range from 200 mm to 1000 mmAq. An inadequate temperature or a rapid moving rate causes air bubbles to form at the internal boundary. Accordingly, the assembly was first drawn to yield a diameter of about 50 mmφ in the initial step so that sufficient welding may occur at the boundary. Then, the diameter of 75 mmφ, 100 mmφ, 125 mmφ and 150 mmφ, thus obtaining 5 types of preforms in total. The five preforms finally obtained had a maximum outer diameter of 152 mmφ, and they weighed about 71 kg as a whole. This was an amount corresponding to a primary optical fiber having a length of 2600 km.

The characteristics of the resulting preform was evaluated in further detail. A 50 mmφ diameter preform was chosen as the sample. The core characteristics were observed by using a preform analyzer to find the preform to have no step difference but a seam with approximately 0.008% in refractive index at the boundary between the core and the cladding layer, and the center displacement of the core from the cladding layer to be 0.28%.

The above 50 mmφ preform was drawn with a optical fiber drawing machine to obtain a fiber 125 μm±0.5 μm in outer diameter. The resulting primary optical fiber were found to give transmission characteristics of an eccentricity of 0.11 μm, a cut off wavelength $\lambda_c$ of 1.270 μm, a transmission loss for 1.3 μm wavelength of 0.361 dB/km, and OH group loss for 1.38 μm wavelength of 0.65 dB/km.

EXAMPLE 5

A large porous soot material having produced by outside vapor-phase deposition (OVD) method was dehydrated, subjected to treatment for refractive index adjustment, and vitrified in the same manner as in Example 4 to obtain a tubular synthetic quartz glass mother material. The inner and the outer peripheries of the resulting product were mechanically ground to achieve 4 synthetic quartz glass primary tubes.

After the inner diameter of the resulting primary tube was finished with high precision honing machine to 32 mmφ, the center lines for inner and outer diameters respectively were shifted artificially. Then, the outer surface was ground to an outer diameter of 100 mmφ with an outer to inner diameter ratio $D_o/D_i$ of 3.125. Finally, the tube was finished by etching with hydrofluoric acid solution and washing with water. The measured thickness error for the resulting primary treated synthetic quartz glass tube is shown in Table 4.

The above primary treated synthetic quartz glass tube was drawn under the pressure range from 0 to 100 mmAq fluid and heated at 2200° C. in an electric heating furnace to examine for dimensional change caused by processing. The results are summarized in Table 4.

TABLE 4

| Sample No. | Thickness Error of Primary Treated Tube (%) | A 3.125 1.0 | B 2.88 1.085 | C 2.68 1.166 | D 2.39 1.308 | E 2.22 1.408 | F 2.04 1.532 | G 1.533 2.04 | Condition α* β** |
|---|---|---|---|---|---|---|---|---|---|
| 12 | ±0.6 | 1 | 1 | 0.5 | 0.5 | 1 | 1.5 | 2.5 | Thickness Error of the |
| 13 | ±1.8 | 2 | 2 | 2 | 3 | — | — | — | Heated - treated Tube |
| 14 | ±3.9 | 4 | 6 | 13 | — | — | — | rupture | (%) |
| 15 | ±5.6 | 6 | 15 | — | — | — | — | — | |

Note
α*: $d_o d_i$; β**: $(D_o/D_i)/(d_o/d_i)$

Condition A: The internal pressure was adjusted to be about the same as the external pressure.

As shown in Table 4, a quartz glass primary treated tube with large error reveals larger error when it is treated under an increased pressure ratio and an increased drawing ratio. In particular, the pressure ratio directly increases the thickness error of the quartz glass tube. The primary treated tube with error more than 3.9% was deformed asymmetrically under unstabilized conditions at the beginning and expanded rapidly into rupture in the furnace.

An optical fiber core glass rod was inserted into one (No. 13) of the heat-treated synthetic quartz glass tubes fabricated above under condition B, i.e., a quartz glass tube obtained from a primary treated tube having a thickness error within 1.8% and finished to a thickness error within 2% by hot drawing under pressure. A preform was obtained therefrom by a rod-in-tube technique. This preform was found that a difference in refractive index between the cladding layer and the rod was as low as 0.01% or less, and an eccentricity after drawing of 0.45 μm upon evaluation with a preform analyzer. It can be seen, therefore, that the preform can be favorably used as a single mode use optical fiber.

EXAMPLE 6

A large-scale cylindrical natural quartz glass mother material produced by the Verneuil process using an oxyhydrogen flame was perforated at the center using a hot carbon drill press-in process in the same manner as in Example 3.

The outer periphery of the resulting product was mechanically ground and finished followed by etching with hydrofluoric acid solution, by washing with water and drying to obtain a primary treated quartz glass tube having the outer diameter of 175 mmφ, the inner diameter of 60 mmφ, the ratio of the outer to the inner diameter of 2.916, the length of 3 m and the weight of 150 kg. The average thickness error along the longitudinal direction at each of 50 mm interval points reveals 0.3 mm which falls into the predetermined error range.

Furthermore, the surface was examined for roughness by a contact type compact roughness meter to find an $R_{max.}$ of <0.8 μm for the inner surface and <95 μm for the outer surface at the end portion of the tube. A single mode optical fiber rod having a cladding partially for use of 1.3 μm wave length produced by VAD method was inserted into the aforementioned primary treated quartz glass tube and disposed in a vertical type electric furnace. The end of portions of the rod were welded at the temperature of 2250° C. in a reduced atmosphere pressure. The rod-in tube process was conducted to obtain a preform having a maximum outer-diameter of 160 mmφ under conditions wherein the degree of vacuum and the initial drawn outer diameter are set to be 200 mm to 1000 mmAq and 50 mmφ, respectively, and the temperature, the traveling speed and the degree of vacuum were changed depending on the fused state at the boundary between the core rod and the primary treated quartz glass tube.

The above treated preform drawn initially with 50 mmφ in diameter examined by a preform analyzer shows 0.52% in eccentricity and approximately −0.005% in refractive index difference with slightly lower index of the tube. The above preform is drawn by a drawing machine to have an optical fiber of 125 μm in diameter revealing 0.41 μm in eccentricity and −0.346 dB/km in transmission loss at 1.3 μm wave length. It can be considered, therefore, that the preform can be favorably used as single mode use optical fiber.

EXAMPLE 7

A cylindrical quartz glass mother material made from high purity natural quartz glass was perforated at the center by using a hot carbon drill press-in process in the same manner as in Example 6.

The outer periphery, with the center line for the outer diameter being placed to that of the inner diameter, was ground, confirming its dimensional precision, etched with hydrofluoric acid solution, washed with water and dried. Thus treated quartz glass tube, having the outer diameter of 150 mmφ, the inner diameter of 62 mmμ, the outer to the inner diameter ratio of 2.42 and the length of 2,500 mm, was measured along the longitudinal direction at each of 50 mm interval points to show 0.35 mm (0.79%) in thickness error, less than 1 μm in roughness $R_{max}$ of the inner surface and 85 μm in roughness $R_{max}$ of the outer surface.

The above quartz glass was proved to contain an OH group with 166 ppm in average by inspecting its 2.7 μm absorption band by an infrared spectrophotometer.

The above quartz glass tube was disposed in a vertical type electric furnace having 2250° C. in temperature to weld the bottom end portion of the tube. Drawing was conducted under pressure controlled by air from the upper end portion to obtain the heat treated quartz glass tube having 50 mmφ, 75 mmφ and 125 mmφ in outer diameter, respectively. The sized each heat treated quartz glass tube are shown in Table 5.

TABLE 5

| Tube | $d_o$ | $d_i$ | $d_o/d_i$ | $D_o/D_i$ $d_o/d_i$ | Roughness of Inner Surface $R_{max.}$ (μm) |
|---|---|---|---|---|---|
| Heat- | 50 | 23.3 | 2.15 | 1.13 | <1 |
| treated | 75 | 34.4 | 2.18 | 1.11 | <1 |
| Quartz | 100 | 44.6 | 2.24 | 1.08 | <1 |
| Glass | 125 | 54.2 | 2.31 | 1.05 | <1 |
| Tube | | | | | |
| Preheated | 150 | 62 | 2.42 | 1.00 | <1 |
| Tube | | | | | |

An optical fiber rod for single mode made by VAD method was integrated into the heat-treated quartz glass tube with 100 mmφ in outer diameter by using the rod-in tube process. Three kind of heat treated tubes having respectively 50 mmφ, 75 mmφ and 96 mmφ in outer diameter at the time when drawing initiated were produced. Each of preforms was sliced and ground to find bubbles at the welded surface between the inner surface of the quartz glass tube and the outer surface of the core rod. However, almost none of bubbles can be seen. An optical fiber produced by drawing the preform described above having 50 mmφ in diameter revealed 0.27 μm in eccentricity and 0.347 dB/km in transmission loss for 1.3 μm wave length.

Numerous modifications and variations of the present invention are possible in light of the above teachings, and therefore, within the scope of the appended claims, the invention may be practised otherwise than as particularly described.

We claim:

1. A large-sized quartz glass preform comprising:

(a) a large-sized quartz glass tube having an outer diameter falling in a range from 50 mmφ to 300 mmφ; an outer to inner diameter ratio falling in a range from 2.5 to 7, a wall thickness being 10 mm or more, a wall thickness error being 2% or less, an inner surface roughness of 20 μm or less, wherein the large-sized quartz glass tube is a high purity synthetic quartz glass tube; and (b) a core glass rod for an optical fiber combined integrally with the large-sized quartz glass tube, where the refractive index of the glass tube differs within 0.02% from a predetermined value relative to the refractive index of the core glass rod.

2. The large-scale quartz glass preform set forth in claim 1, wherein the large-sized quartz glass tube is a large-sized primary treated quartz glass tube produced in accordance with steps of:

(a) perforating a quartz glass mother material with a mechanical perforator;

(b) grinding, abrading and finishing inner and outer surfaces of the perforated mother material by high precision honing;

(c) grinding an outer surface of the perforated mother material by peripheral grinding;

(d) etching the inner and outer surfaces with hydrofluoric acid; and (e) subsequently washing the mother material.

3. The large-scale quartz glass preform set forth in claim 1, wherein the large-sized quartz glass tube is a large-sized primary treated quartz glass tube produced in accordance with steps of:

(a) perforating a cylindrical quartz glass mother material by a hot carbon drill press-in process;

(b) grinding an outer surface of the perforated mother material by a peripheral grinding;

(c) etching inner and outer surfaces of the perforated mother material; and (d) subsequently washing the mother material.

* * * * *

UNITED STATES PATENT AND TRADEMARK OFFICE
CERTIFICATE OF CORRECTION

PATENT NO.: 5,837,334

DATED: November 17, 1998

INVENTOR(S): Kiyoshi YOKOKAWA, Masaaki AOYAMA, Gerhart VILSMEIER

It is certified that an error appears in the above-identified patent and that said Letters Patent is hereby corrected as shown below:

On the Title Page, Item [73], in the Assignee, line 2, "Col." should read --Co.,--.

On the Title Page, Item [57], in the Abstract, line 3, "from. 1" should read --from 1.1--.

Signed and Sealed this

Eighth Day of June, 1999

*Attest:*

Q. TODD DICKINSON

*Attesting Officer*    *Acting Commissioner of Patents and Trademarks*